(12) United States Patent
Chase

(10) Patent No.: US 7,145,308 B1
(45) Date of Patent: Dec. 5, 2006

(54) FLOATING ARMATURE ELECTRIC MOTOR AND METHOD OF ASSEMBLY

(76) Inventor: Theodore O Chase, 2340 Shannon Ave., San Pablo, CA (US) 94806

(*) Notice: Subject to any disclaimer, the term of this patent is extended or adjusted under 35 U.S.C. 154(b) by 32 days.

(21) Appl. No.: 11/339,122

(22) Filed: Jan. 24, 2006

(51) Int. Cl.
*G05B 19/40* (2006.01)

(52) U.S. Cl. .................. 318/685; 318/138; 318/245; 318/439; 318/696; 310/46; 310/268

(58) Field of Classification Search ............. 318/138, 318/139, 245, 439, 685, 696; 310/46, 268
See application file for complete search history.

(56) References Cited

U.S. PATENT DOCUMENTS

| | | | | |
|---|---|---|---|---|
| 3,665,227 A | * | 5/1972 | Busch | 310/46 |
| 4,291,248 A | * | 9/1981 | Rainbolt | 310/14 |
| 4,486,675 A | * | 12/1984 | Albert | 310/46 |
| 4,704,555 A | * | 11/1987 | Stokes | 310/268 |
| 4,835,840 A | * | 6/1989 | Stokes | 29/598 |
| 5,138,207 A | * | 8/1992 | Hilal et al. | 310/46 |
| 5,144,179 A | * | 9/1992 | Hilal et al. | 310/46 |
| 5,955,808 A | * | 9/1999 | Hill | 310/180 |
| 6,252,317 B1 | * | 6/2001 | Scheffer et al. | 310/46 |
| 2002/0125781 A1 | * | 9/2002 | Bales | 310/156.35 |
| 2003/0201693 A1 | * | 10/2003 | Bales | 310/268 |
| 2004/0207286 A1 | * | 10/2004 | Bales et al. | 310/268 |
| 2004/0222708 A1 | * | 11/2004 | Hobson et al. | 310/36 |

* cited by examiner

*Primary Examiner*—Paul Ip
(74) *Attorney, Agent, or Firm*—Risto A. Rinne, Jr.

(57) ABSTRACT

An apparatus for converting electrical energy into mechanical energy includes a plurality of iron segments disposed in a circular, generally donut-shaped body that is substantially non-magnetic, and which forms a rotor of an electric motor. Each of a first plurality of coils is attached to a housing and form a stator. Each coil includes a hollow center and is disposed around the body. The coils are pulsed on and off in a pattern to create a magnetic field that attracts the iron segments urging them sufficient to rotate the body. The body forms a rotor of the electric motor. A second plurality of coils are optionally included and energized in an opposite or offset pattern as compared to the first plurality to increase torque or aid in starting rotation of the rotor. A permanent magnet in the rotor is used to indicate the position of the rotor relative to the stator. The rotor includes a pair of horseshoe-shaped overlapping halves that fasten together. A method of energizing each coil for a preferred duration of time regardless of the speed of the rotor or position of the coil on the housing is described.

15 Claims, 4 Drawing Sheets

FLOATING ARMATURE ELECTRIC MOTOR AND METHOD OF ASSEMBLY

BACKGROUND OF THE INVENTION

1. Field of the Invention

The present invention, in general, relates to solenoid types of motors and, more particularly, to a floating armature type of an electric motor and method of assembly.

These types of electric motors are, in general, known and are sometimes referred to as a ring motor, a ring rotor, a floating armature motor, or a rotating solenoid motor.

In general, a circular rotor, also called an armature, fits inside a series of spaced-apart coils. The coils, when periodically energized, act as electromagnets. The rotor (or armature) includes an open center. The rotor includes a ferric material and by a sequential, pulsed energizing of the coils, the ferric material is urged in one direction or the other by magnetic attraction.

By periodically de-energizing the coils, inertia is used and continues to move the rotor sufficiently far so that a subsequent re-energizing of the coils will continue to urge the rotor to move in the same direction. This process is repeated to cause the rotor to turn continually and to function as an electric motor.

However, torque and efficiency in prior art designs has suffered for a variety of reasons, a few of which are described briefly, hereinafter.

It is possible to dispose three or more gears in cooperation with gear teeth attached to the rotor in order to secure the rotor in position and to extract useful energy (i.e., rotary motion) from the rotor.

A thin motor with relatively high torque is provided by certain of the prior art designs. While certain of these benefits are known, this type of a device has been difficult to build. Also, performance, output, torque and efficiency have been limited. These obstacles have prevented widespread use of this general type of motor design.

For example, it is especially difficult to manufacture and dispose a plurality of coils around a contiguous type of a rotor that includes a plurality of sequential ferric elements. It has been necessary, previously, to secure the coils to a housing in a precise way.

With prior art designs, the coil may include a shell that is split in half, disposed around the rotor, and then wound while it is disposed around the rotor.

Also, according to prior art designs the spacing of the coils around the rotor and their attachment to the housing must be precise. Furthermore, a way of sensing rotor position with respect to the housing (i.e., the coils) is also required. This positional information is then used to energize a coil for a period of time. Then a "best guess" is used to determine when to de-energize the coil.

If the speed of the motor is low, then the coil is energized for too short of a period of time. This means that the rotor is asked to "coast" before a center of the ferric element has reached a midpoint in the coil. This is the ideal time to de-energize the coil and to then allow the rotor to coast (or to possibly energize another coil that includes another ferric element that is approaching it).

Consequently, too short a period of time for coil energizing decreases horse-power output, torque, and motor efficiency.

Conversely, if the speed of the motor is high, then the coil is energized for too long a period of time. This causes the midpoint of the ferric element to pass beyond the midpoint of the coil before de-energizing of the coil occurs. When this happens (i.e., when the center of the ferric element passes beyond the midpoint of the coil and therefore beyond the midpoint of the magnetic field), the electro-magnetic field that is produced by the coil immediately begins to apply a force to the ferric element in an opposite direction with respect to the inertial movement of the rotor.

This, in turn, attempts to slow the rotor down for as long as the coil remains energized. It also robs torque and power rendering the motor with poor torque, power output, and low efficiency. Additionally, it limits maximum speed (rpm) for similar prior-art designs to low speeds.

Accordingly, these types of problems have plagued the related prior art types of electric motors and that is why they have seen limited use and have not been produced in significant quantity.

Accordingly, there exists today a need for a floating armature electric motor and method of assembly that helps to ameliorate the above-mentioned difficulties.

Clearly, such an apparatus and method of use would be useful and desirable.

2. Description of Prior Art

Similar types of electric motors are, in general, known. For example, the following patents describe various types of these devices:

U.S. Pat. No. 6,252,317 to Scheffer et al. Jun. 26, 2001;
U.S. Pat. No. 4,291,248 to Rainbolt, Sep. 22, 1981;
U.S. Pat. No. 4,214,178 to Tippner, Jul. 22, 1980;
U.S. Pat. No. 3,665,227 to Busch, May 23, 1972;
U.S. Pat. No. 1,068,531 to Rhodes, Jul. 29, 1913;
U.S. Pat. No. 741,325 to Gibbs, Oct. 13, 1903; and
U.S. Pat. No. 517,858 to Greenfield, Apr. 10, 1894.

While the structural arrangements of the above described devices may, at first appearance, have similarities with the present invention, they differ in material respects. These differences, which will be described in more detail hereinafter, are essential for the effective use of the invention and which admit of the advantages that are not available with the prior devices.

OBJECTS AND SUMMARY OF THE INVENTION

It is an object of the present invention to provide a floating armature electric motor that is efficient.

It is also an important object of the invention to provide a floating armature electric motor that is easy to manufacture.

Another object of the invention is to provide a floating armature electric motor that is easy to assemble.

Still another object of the invention is to provide a floating armature electric motor that produces high torque.

Still yet another object of the invention is to provide a floating armature electric motor that is thin.

Yet another important object of the invention is to provide a floating armature electric motor that includes a rotor that separates into two parts and which includes an overlapping portion.

Still yet another important object of the invention is to provide a floating armature electric motor that includes a method of detecting position of an armature with respect to a rotor of the motor.

A first continuing object of the invention is to provide a floating armature electric motor that can be scaled in size to produce a high-torque, highly efficient electric motor that is thin and lightweight for the power produced.

A second continuing object of the invention is to provide a floating armature electric motor that includes a first set of coils and a second set of coils that are disposed around the armature and wherein for a first period of time the first set of coils are energized while the second set is de-energized, followed by a second period of time during which the first set of coils are de-energized and the second set is energized.

A third continuing object of the invention is to provide a floating armature electric motor that includes a first set of coils and a second set of coils that are disposed around the armature and wherein for a first period of time the first set of coils are energized as the second set is de-energized, followed by a second period of time during which the first set of coils are de-energized and the second set is energized followed by recurrences of the first period of time followed by the second period of time.

A fourth continuing object of the invention is to provide a floating armature electric motor that is inexpensive to manufacture.

A fifth continuing object of the invention is to provide a floating armature electric motor that has a minimal number of moving component parts.

A sixth continuing object of the invention is to provide a floating armature electric motor that is reliable.

A seventh continuing object of the invention is to provide a floating armature electric motor that has a long life-expectancy.

An eighth continuing object of the invention is to provide a floating armature electric motor that is easy to repair or rebuild.

A ninth continuing object of the invention is to provide a floating armature electric motor that is able to produce a nearly constant amount of torque.

A tenth continuing object of the invention is to provide a floating armature electric motor that is able to rotate in either a first or an opposite second direction when a pulsed waveform is applied thereto.

An eleventh continuing object of the invention is to provide a floating armature electric motor that is able to control the direction of rotation in either a first or an opposite second direction by control of the timing of a pulsed waveform that is applied thereto.

A twelfth continuing object of the invention is to provide a floating armature electric motor that energizes a coil for the proper amount of time regardless of motor speed.

A thirteenth continuing object of the invention is to provide a floating armature electric motor that includes means to energize a coil for a period of time that increases motor efficiency.

A fourteenth continuing object of the invention is to provide a floating armature electric motor that includes means to energize a coil for a period of time that increases motor torque.

A fifteenth continuing object of the invention is to provide a floating armature electric motor that includes non-critical spacing of the coils on a housing.

A sixteenth continuing object of the invention is to provide a floating armature electric motor that includes at least one electro-magnet coil and wherein the coil includes means for sensing the position of the armature (rotor) with respect thereto.

A seventeenth continuing object of the invention is to provide a floating armature electric motor that includes means to energize a coil for a period of time that increases motor power output.

An eighteenth continuing object of the invention is to provide a floating armature electric motor that provides a wide useful range in speed (rpm) of the motor.

A nineteenth continuing object of the invention is to provide a floating armature electric motor that can operate at high speed.

A twentieth continuing object of the invention is to provide a floating armature electric motor that permits the use of ferric elements (i.e., iron segments) that include a variable length thereto, as preferred, and which are disposed in a rotor.

A twenty-first continuing object of the invention is to provide a floating armature electric motor that can be used as an electric brake to maintain position of a rotor with respect to a stator, and therefore to maintain position of a load that is adapted to be driven by said rotor.

Briefly, a floating armature electric motor that is constructed in accordance with the principles of the present invention has a floating armature that includes a plurality of iron segments disposed in a circular, generally donut-shaped body that is non-magnetic, and which forms a rotor of the electric motor. Each of a first plurality of coils is attached to a housing and form a stator. Each coil includes a hollow center and is disposed around the body. The coils are pulsed on and off in a pattern sufficient to urge the iron segments of the body to move sufficient to rotate the body. The body forms an armature, or rotor, of the electric motor. A second plurality of coils are optionally included and energized in an opposite or offset pattern as compared to the first plurality to increase torque and aid in starting. Permanent magnets in the rotor and sensors in the coil are used to indicate the position of the rotor relative to the stator regardless of where the coils are disposed on the housing and regardless of rotor (i.e. motor speed or rpm). The rotor includes a pair of horseshoe-shaped overlapping halves that separate to allow insertion of a plurality of coils around the rotor. The two halves of the rotor then fasten together. The coils are then separated, attached to a stator (or housing), and electrically connected to control means to energize them at the appropriate times and for an appropriate duration of time.

DETAILED DESCRIPTION OF THE INVENTION

Figure 1:
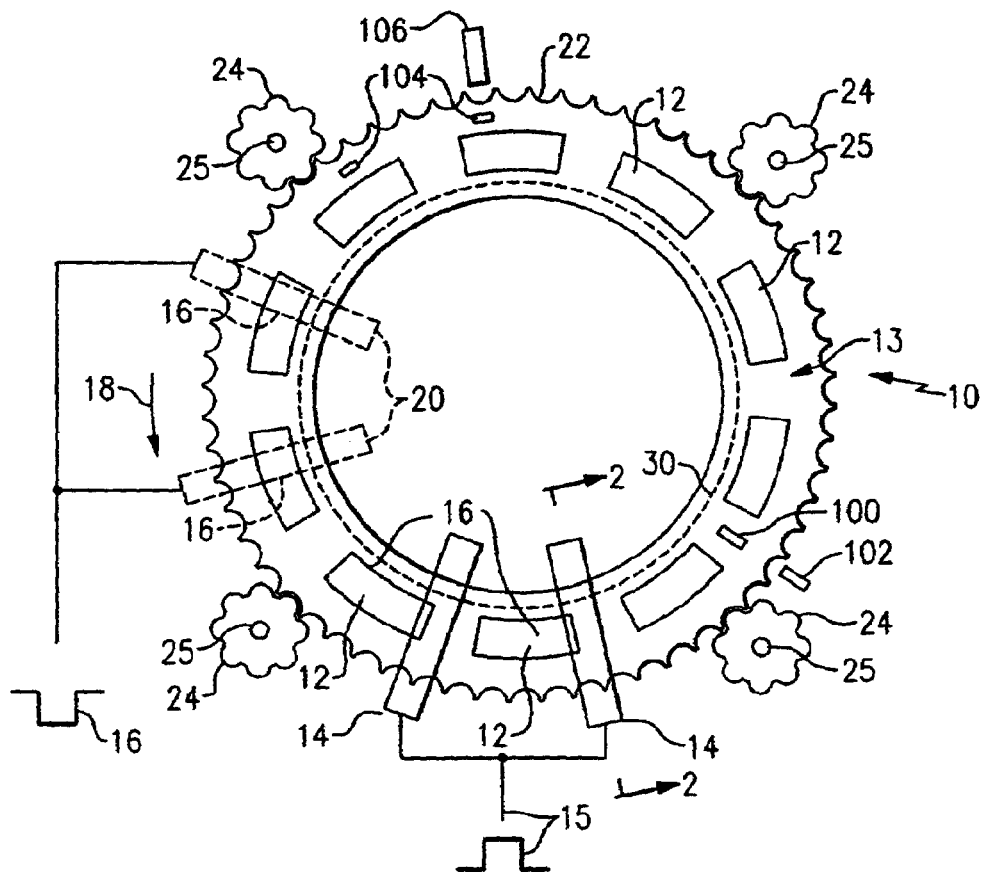
FIG. 1 is a top view of a floating armature electric motor.

Referring to all of the drawings on occasion, and now in particular to FIG. 1 is shown, a floating armature electric motor, identified in general by the reference numeral 10.

The floating armature electric motor 10 includes a plurality of spaced-apart iron segments 12 disposed inside a circular body or disk, the body being identified in general by the reference numeral 13. The general shape of the body 13 is similar to that of a conventional donut with a hollow or open center. A toroid includes a similar shape. Because the body 13 rotates, it is also occasionally referred to herein as a "rotor".

The iron segments 12 are of any preferred cross-sectional shape, including round, oval, or polygonal. Any preferred length or quantity for the iron segments 12 is possible. The iron segments 12 are each a ferric element (i.e., component) necessary to this type of motor-design.

The body 13 is preferably flat and about an inch thick, generally round, and with a hollow center. Of course, other shapes and sizes are possible for the body 13 for use with variations of the floating armature electric motor 10.

Other than the iron segments 12, the remainder of body 13 is not magnetically conducting, and is formed of any preferred, non-magnetic material, including for example, aluminum, plastic, graphite, nylon, or similar material. Any non-ferrous metal can similarly be used to form the body 13.

It is possible to include a small amount of ferrous material in the body 13, other than the iron segments 12, if this is deemed necessary for strength, wear, or other considerations, however, such use will decrease overall efficiency of operation of the floating armature electric motor 10 and is not generally preferred. It is also preferably to include one portion of a sensing means in the body 13, as described in greater detail hereinafter.

The iron segments 12 are preferably curved to include a radius that corresponds with a radius extending from a geometric center of the body 13. The length, quantity, and spacing of the iron segments 12 are all design variables.

According to the instant invention, it is not even necessary that all of the iron segments 12 include the same length, as all similar prior art designs require. For example, certain of the iron segments 12 can be longer or shorter, as desired. The manner by which such versatility in internal design is achieved is described in greater detail hereinafter, in the discussion about detecting the position of the body 13 (rotor) near the end of the specification.

A plurality of the electromagnet coils 14 are preferably used. The electromagnetic coils 14 are, after assembly of the floating armature electric motor 10, disposed in a spaced-apart relationship around the circumference of the body 13. This is described in greater detail hereinafter.

Each of the electromagnetic coils 14 is attached to a housing and, because the housing is stationary, forms a stator of the floating armature electric motor 10. The housing (stator) is not shown because the use of motor housings, in general, is well known and understood.

The housing is that part of the floating armature electric motor 10 that the coils 14 are attached to. The housing includes any preferred shape or size as may be required although an expected shape for the housing is that of a thin cylinder, similar to a "thick" pancake.

This is because the general shape of the rotor body 13 (armature) resembles a cylinder with a short longitudinal length. The housing is expected to surround the body 13 and to surround a plurality of driven gears 24 (as described in greater detail hereinafter) and will therefore likely have a similar, but larger, general shape thereto. An output power shaft used to extract power from any of the driven gears 24 is expected to protrude from the housing, as is common in most types of motor design.

Design objectives permit a varying of the attributes of the electromagnet coils 14, as desired, including the size and quantity of windings (i.e., the size and length of insulated electrical conductive wire that is used to form the electromagnetic coils 14) or the spacing and quantity of the coils 14. The use of coils 14 is well known in the electrical motor arts and is described herein only to illustrate a few of the design options that are available for use and modification of the floating armature electric motor 10.

For example, a larger size wire may allow for greater current flow and increased torque, whereas a smaller wire size may allow for lower current flow and increased efficiency of operation.

Similarly, a greater quantity of spaced-apart electromagnetic coils 14 can be used to increase torque. The number and spacing of the electromagnetic coils is a variable. For example, the number of coils 14 can be more, less, or equal to the number of iron segments 12.

The spacing of the coils 14 can be equidistant or variable, as preferred. A non-equidistant spacing of the coils 14 allows for pulsed sequential energizing and de-energizing of the coils 14 to produce a nearly constant and steady torque output by the floating armature electric motor 10.

In general, more than one of the coils 14 is always included and several or more of the coils 14 are preferably included with the floating armature electric motor 10.

The electromagnetic coils 14 are attached to a housing (not shown) of the floating armature electric motor 10 and form a stator (i.e., stationary part). The body 13 forms a rotor (i.e., rotary part) of the floating armature electric motor 10.

Four of the iron segments 12, as shown, include a geometric center mark 16 that is disposed along a midpoint of the longitudinal length of each of the iron segments 12. The geometric center mark 16 is not expected to be included with the actual iron segments 12 and is included in the drawing figure to help illustrate operation of the floating armature electric motor 10.

Referring now to the bottom two geometric center marks 16, initially they are disposed away from the center of the electromagnetic coils 14. Whenever any of the electromagnetic coils 14 are energized, their geometric center (i.e., where the geometric center mark 16 is located) will precede the center of the coils 14, if motion of the floating armature electric motor 10 (i.e., of the body 13) continues in a direction it is already moving or which it is intended to be urged.

The electromagnetic coils 14 can be energized all at once or alternately in a group, as is described in greater detail hereinafter. If preferred, the spacing of the electromagnetic coils 14 can each be progressively staggered and a first one (or a first group) of the coils 14 can be energized while the remainder of the coils are not energized.

Then, a second one (or a second group as is described in greater detail hereinafter) of the electromagnetic coils 14 is energized while the first one (or the first group) is de-energized. This process is repeated until all of the coils 14 have progressively been energized and de-energized. The process is repeated for as long as operation of the floating armature electric motor 10 is desired. This process is also described in greater detail hereinbelow.

According to the illustration, the two bottom electromagnetic coils 14 are pulsed with DC as shown by a first pulse waveform 15 to create a magnetic field which urges the geometric center mark 16 of the bottom-two iron segments 12 toward a center of the bottom-two coils 14. This type of operation, where an iron member (i.e., the iron segments 12) is urged to move longitudinally in a magnetic field (i.e., in the coils 14), is generally known and resembles somewhat the operation of a solenoid (not shown).

Accordingly, rotation of the body 13 occurs in a direction shown by arrow 18. The direction of rotation of the body 13 can be controlled to rotate in either direction. To control the direction of rotation, it is necessary to know the position of the iron segments 12 with respect to the electromagnetic coils 14. The direction of rotation is controlled by selectively energizing certain of the coils 14 that are disposed on a preferred side of certain of the iron segments 12.

The affected iron segments 12 will be urged, along with the body 13 that they are attached to, in a direction toward the energized coils 14. Then, as the center of the selected iron segments 12 (where the geometric center mark 16 is disposed) reaches the center of the selected coils 14, the selected coils 14 are de-energized while other coils 14 are energized to continue rotation in either the direction shown by arrow 18 or, if preferred, in an opposite direction.

To produce torque, at least some of the coils 14 are energized providing that some of the geometric center marks 16 are disposed away from center of the coils 14. If the marks 16 are all disposed at the geometric center of the coils 14, the body 13 will not rotate. That is why it is preferable that the coils 14 are either staggered in their position with respect to the iron segments 12 or arranged in two or more groups that are staggered with respect to the iron segments 12.

In that manner, certain of the coils 14 can always be energized to produce torque sufficient to cause rotation of the body 13. Once the body 13 begins to rotate a timed and sequential pulsing on and off of the coils 14 is used along with the inertia of the body 13 to continue its rotation in a given direction.

It is also possible to energize all of the coils 14 in a less-expensive version of the floating armature electric motor 10 where there is no staggering and no internal sensing of the relative position of the stator (i.e., of the coils 14) with respect to the rotor (i.e., of the body 13).

By pulsing all of the coils 14 repeatedly on and off in the less-expensive version, rotation will occur and continue for as long as the pulsing continues unless all of the marks 16 happen to align with the centers of all of the coils 14 at startup.

A slight nudge (force) is then applied to any driven output of the floating armature electric motor 10. That force is eventually transferred through a drive train, as described in greater detail hereinafter, to the body 13 which, in turn, is urged slightly in one direction or the other. This introduces the required offset between the marks 16 and the center of the coils 14. A release of the force that is being applied is sufficient to start the body 13 rotating and set the floating armature electric motor 10 in operation until the pulsing is stopped.

Once rotation of the body 13 is occurring, just prior to the marks 16 reaching the center of the electromagnetic coils 14, the pulse waveform 15 is turned off and inertia carries the armature (i.e., the body 13) beyond the center of the coils 14 and further in direction of arrow 18. The magnets 14 are pulsed 15 again thereby drawing the next set of iron segments 12 toward the center of the electromagnet coils 14. This process is repeated for as long as operation of the floating armature electric motor 10 is desired. While this configuration produces an especially simple and reliable type of the floating armature electric motor 10, maximum torque is not obtained because the duty cycle of the pulse waveform 15 is less than 100%.

If desired, a second set (or group) of electromagnetic coils 20 (shown in dashed lines) are included and are offset with respect to the coils 14 so that when the coils 14 are energized (i.e., pulsed on), the second electromagnetic coils 20 are de-energized or off, as shown by second pulse waveform 16. When the electromagnetic coils 14 are off, the second electromagnetic coils 20 are on and vice-versa.

If desired, a third set of coils (not shown) or additional groups of coils may also be included, each group having a progressive mechanical offset with respect to the body 13. It is possible to energize each group of coils progressively with the remaining group not energized, or off.

It is also possible for the pattern of energizing each of the groups of coils 14, 20 (or additional groups of coils, if desired) to include an overlap between each group wherein the second group of coils 20 is energized while the preceding first group 14 is also energized for a remaining short period of time. This occurs as the body 13 (i.e., the rotor) is turning. Then, the first group 14 is de-energized while the second group 20 continues to be energized. Then, a third group of coils (if included) is energized while the second group 20 remains energized for the short period of time. This pattern continues for as many groups of coils as are included in the floating armature electric motor 10. By including the overlap in the energizing of the groups of coils, maximum additional torque is created.

This configuration of two or more groups of coils 14, 20 ensures that starting of the floating armature electric motor 10 will occur even if the body 13 is disposed at a standstill with the center mark 16 in the center of the electromagnetic coils 14. If the center mark 16 is disposed in the center of first group of coils 14, it will not be in the center of the second group of coils 20 and therefore, starting torque will occur when the second group of coils 20 is energized. It also allows for easy control of direction of rotation by initially pulsing either set of coils 14, 20 depending upon which set 14, 20 is disposed on a preferred side of the iron segments 12.

The body 13 includes a gear-tooth outer perimeter 22 that is disposed in a gear recess (identified by reference numeral 23, FIG. 3) that is provided circumferentially in the perimeter of the body 13. A plurality of driven gears 24 are attached to the housing and fixed in place to secure the body 13 in position. The gears 24 are able to rotate about a center axis shaft 25 in either direction, depending upon the direction of rotation by the body 13. Accordingly, the body 13 (i.e., the armature or rotor) appears to float and is suspended by the gears 24 which are held captive in the gear recess 23.

As the body 13 is urged to rotate, power is transferred to the gears 24, which rotate in an opposite direction as the body 13. The rotational movement of any of the gears 24 can be used to extract power from the floating armature electric motor 10 for any desired purpose. The gears 24 are driven by rotation of the body 13. Together, the gear-tooth outer perimeter 22 and the gears 24 form an elementary drive train, from which power is extracted from the floating armature electric motor 10.

While only two of the coils 14 and two of the second electromagnetic coils 20 are shown, any desired number may be included with the floating armature electric motor 10.

If desired, gear teeth (not shown) can be located on an inside circumference of the body 13. However, the gear-tooth outer perimeter 22 helps promote maximum ease of assembly and stability of design.

Figure 2:
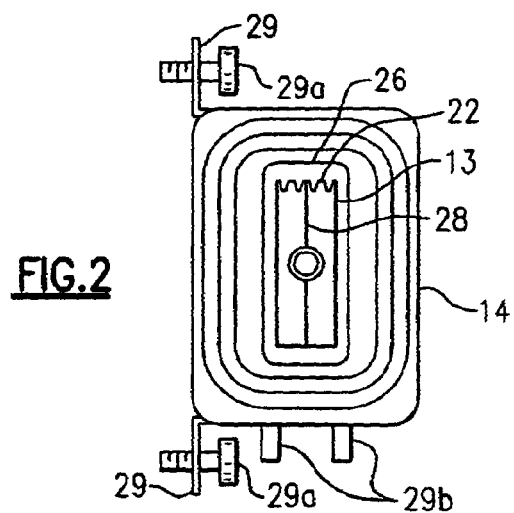
FIG. 2 is a cross sectional view taken on the line 2—2 in FIG. 1.

Referring now primarily to FIG. 2, each of the electromagnetic coils 14 includes a hollow center 26. The body 13 is disposed in the hollow center 26. When energized, the electromagnetic coils 14 produce strong magnetic flux in the hollow center 26 sufficient to urge the iron segments 12 toward the center of each of the coils 14 that is energized. The iron segment 12 is disposed in the center of the body 13.

The body 13, as shown, includes a portion that is split in half along a portion of the circumference of the body 13, as is described in greater detail hereinafter, and as shown by line 28.

A pair of mounting brackets 29 with mounting bolts 29a are shown in the cross-sectional view (FIG. 2) to illustrate how the electromagnetic coil 14 is attached to the housing. The mounting brackets 29 and mounting bolts 29a are not shown in FIG. 1 to reduce clutter in the drawing figure.

Similarly, a pair of electrical contacts 29b are shown in FIG. 2 and correspond to opposite ends of the winding used to form the electromagnetic coil 14. During assembly, the electrical output of the pulsed waveforms 15, 16 are connected to the contacts 29b.

It is also possible to add weight to the body 13 to increase its inertia. For example, a lead disk 30 (shown in dashed lines) can be attached thereto to increase inertia.

It is important to be able to easily manufacture the floating armature electric motor 10. Simplicity in assembly and disassembly is required for optimum commercial success. Prior art types of similar electric motors have not permitted easy assembly of the coils 14, 20 around the body 13. Prior art teachings result in devices that are either impossible to assemble, as disclosed, or weak in design and their ability to transmit torque.

Figure 3:
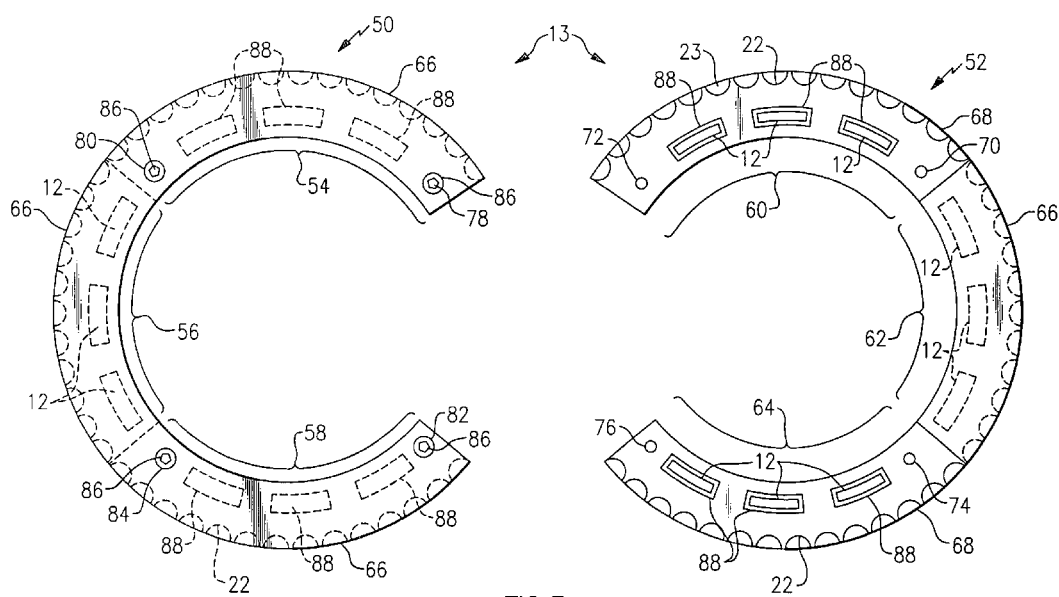
FIG. 3 is a top view of the floating armature of FIG. 1, with two halves of a disk-body in a spaced-apart orientation prior to assembly.

Referring now primarily to FIG. 3, the body 13 is shown as including a first half of the armature, identified in general by the reference numeral 50 and a second half of the armature, identified in general by the reference numeral 52.

Each half 50, 52 is circular and resembles a horseshoe in shape. The first half 50 is later placed on top of the second half 52 during assembly.

The first half 50 includes a first section that extends for about one-quarter of the overall circumference of the body 13. The span of the first section is identified by a first bracket 54. The first section 54 includes one-half the nominal thickness of the body 13 when the two halves 50, 52 are assembled together.

The first half 50 includes a second section that extends for about one-quarter of the overall circumference of the body 13. The span of the second section is identified by a second bracket 56. The second section 56 begins at a first end thereof adjacent the first section 54 and extends to an opposite second end where it is adjacent the beginning of a third section, as shown by bracket 58.

The third section 58 also includes one-half the nominal thickness of the body 13 when the two halves 50, 52 are assembled together.

The second section 56 is equal to the thickness of the body 13 and no overlap occurs between the second section 56 and the second half 52.

The second half 52 includes a fourth section that extends for about one-quarter of the overall circumference of the body 13. The span of the fourth section is identified by a fourth bracket 60. The fourth section 60 includes one-half the nominal thickness of the body 13 when the two halves 50, 52 are assembled together.

The second half 52 includes a fifth section that extends for about one-quarter of the overall circumference of the body 13. The span of the fifth section is identified by a fifth bracket 62. The fifth section 62 begins at a first end thereof adjacent the fourth section 60 and extends to an opposite second end where it is adjacent the beginning of a sixth section, as shown by bracket 64.

The sixth section 64 also includes one-half the nominal thickness of the body 13 when the two halves 50, 52 are assembled together.

The fifth section 62 is equal to the thickness of the body 13 and no overlap occurs between the fifth section 62 and the first half 50.

The gear-tooth outer perimeter 22 of the first half 50 are all shown in dashed lines because they are all disposed below an upper lip 66 that extends around the first, second, and third sections 54, 56, 58 of the first half 50 and the fifth section 62 of the second half 52. An opposite bottom lip 68 also extends around the full circumference of the gear-tooth outer perimeter 22. The bottom lip 68 is visible only on the fourth section 60 and the sixth section 64, as shown, because the upper lip 66 aligns with and covers it with the other sections (54, 56, 58, 62).

Accordingly, the upper lip 66 and the lower lip 68 form the recess 23 with the gear-teeth of the gear-tooth outer perimeter 22 disposed therein and just below the surface of either lip 66, 68. The recess 23 maintains the gear-tooth outer perimeter 22 of the body 13 in cooperation with the gears 24 regardless of the position the floating armature electric motor 10 is disposed in.

The second half 52 includes a first pair of threaded bolt holes 70, 72 disposed in the fourth section 60.

The second half 52 includes a second pair of threaded bolt holes 74, 76 disposed in the sixth section 64.

The first half 50 includes a first pair of upper bolt holes 78, 80 disposed in the first section 54.

The first half 50 includes a second pair of upper bolt holes 82, 84 disposed in the third section 58. The upper bolt holes 78, 80, 82, 84 include an upper recessed area that is adapted to receive a head of a bolt 86 and a lower portion that allows the body of the bolt 86 to pass through and engage with an appropriate one of the threaded bolts holes 70, 72, 74, 76 of the second half 52 to secure the two halves 50, 52 together. Any preferred type of the bolt 86 can be used, for example, Allen-head type of machine screws.

The bolts 86 are formed of any preferred material. If the body 13 is aluminum, the bolts 86 can similarly be formed out of aluminum.

The second section 56 of the first half 50 includes three of the iron segments 12 near a center thereof and in spaced-apart relationship. Fewer or more of the iron segments 12 can be included, depending on their size and length.

The iron segments 12 can be molded in the second section 56 during assembly or, if preferred, the second section 56 can be designed to split in half to allow placement of the iron segments therein and fastening together with machine screws, for example.

The fifth section 62 of the second half 52 also includes three of the iron segments 12 near a center thereof and in spaced-apart relationship, similar to those of the second section 56 of the first half 50.

The fourth section 60 of the second half 52 includes three curved recesses 88, each of which is adapted to receive a corresponding one of the iron segments 12, which are also preferably curved to match the radius of the curved recesses 88. Ideally, the iron segments 12 fit snugly inside of the curved recesses 88 with about one half of each iron segment 12 being disposed in each of the curved recesses 88 and an upper half extending above the plane of the fourth section 60.

The sixth section 64 of the second half 52 also includes three of the curved recesses 88, each of which is adapted to receive a corresponding one of the iron segments 12.

The first section 54 of the first half 50 also includes three of the curved recesses 88, each of which is adapted to cover the upper half of one of the iron segments 12 that is placed in the fourth section 60 when the first half 50 is placed atop the second half 52 and secured thereto.

The third section 58 of the first half 50 also includes three of the curved recesses 88, each of which is adapted to cover the upper half of one of the iron segments 12 that is placed in the sixth section 64 when the first half 50 is placed atop the second half 52 and secured thereto.

The line 28 of FIG. 2 represents a sectional view that was taken through the third section 58 and through the sixth section 64 and shows the first half 50 disposed on the right side of the line 28 and the second half 52 disposed on the left side of the line 28 of the drawing figure.

To assemble the floating armature electric motor 10, the iron segments 12 are deposited in the curved recesses 88 of the second half 52. Then, all of the electromagnetic coils 14, 20 that are to be included in the floating armature electric motor 10 are temporarily crowded side-by-side and are disposed over the fifth section 62. A slight overflow onto the fourth section 60 and onto the sixth section 64 is permissible, as long as assembly of the first half 50 is not excessively impeded.

The first half 50 is then placed over the second half 52 and is secured thereto using the bolts 86. The coils 14, 20 are then spaced apart as desired around the circumference of the body 13 and are secured to the housing by the mounting bolts 29a passing through the mounting brackets 29. Electrical connection is then made to the contacts 29b.

This provides an easy manufacturing method for forming the body 13 (i.e., the rotor or armature) of the floating armature electric motor 10.

The gears 24 are then held against the gear-tooth outer perimeter 22 and the assembled body 13 and gears 24 are placed over the center axis shaft 25 until proper orientation is obtained.

The gears 24 are then pinned to the center axis shaft 25 so they cannot be urged down or up the shaft 25 in order to complete basic assembly of the floating armature electric motor 10.

Certain of the gears 24 can spin freely around the shafts 25, if desired, or they may be secured to the shaft 25 by a set screw (not shown) that engages with a flat portion of the shaft 25. A corresponding flat portion of each of the gears 24 can also engage with the flat portion of each of the shaft 25 to supply torque to any of the shafts 25, as desired.

If useful rotary power is to be extracted from the floating armature electric motor 10, at least one of the shafts 25 is required to be driven by the gear 24, which in turn is driven by the body 13 whenever the body 13 rotates.

A second half of a housing (not shown) is secured to the (first half) housing and the remaining electrical connections complete assembly. Accordingly, a thin, reliable, high torque, electrical motor is provided for use. Should the floating armature electric motor 10 fail, easy disassembly makes repair a feasible option, thereby extending the useful life of the floating armature electric motor 10 indefinitely.

The sequence, duration, and timing of the pulse waveforms 15, 16 are applied to the coils 14, 20 by any of a variety of methods.

A simple, electro-mechanical connection inside the floating armature electric motor 10 that periodically energize and de-energize the coils 14, 20 in response to rotation of the body 13 is one possible method. Proper timing for such electro-mechanical operation is derived by subsequent gears that are attached to and driven by any one of the shafts 25. An assembly mark 100 on the body 13 is set to align with a corresponding assembly mark 102 on the housing during assembly. This ensures that proper timing will occur thereafter.

A preferred alternate method to control timing of the pulsed waveforms 15, 16 is by the use of electronic circuitry or a micro-computer (or both) disposed in or proximate the floating armature electric motor 10. An advantage to this type of control is that factors such as the magnitude of load that is experienced by the floating armature electric motor 10, the speed of rotation of the body 13, and the position of the iron segments 12 with respect to the coils 14, 20 can be factored into the shape and power that is applied to the pulsed waveforms 15, 16.

Therefore, the pulsed waveforms 15, 16 can include a waveform that is other than square or rectangular, if desired.

Ideally, a method of sensing the position of the armature (i.e., the body 13) relative to the housing (i.e., the coils 14, 20) other than the mechanical arrangement described above, is required for optimum efficiency and torque production by the floating armature electric motor 10 when the electronic circuitry or micro-computer is used to control the pulsed waveforms 15, 16.

A series of spaced-apart permanent magnets 104 (only two are shown in FIG. 1) are disposed proximate a perimeter of the body 13. Each of the permanent magnets 104 are disposed in a similar location with respect to one each of the iron segments 12. A sensor 106 is attached to the housing and is used to determine the position of the iron segments 12 with respect to the coils 14, 20. The output of the sensor 106 is connected to the electronic circuitry or micro-computer, which in turn is used to generate the pulse waveforms 15, 16 and energize the coils 14, 20.

If preferred, other methods for sensing position of the body 13 are possible, certain of which are described hereinafter. For example, a photo-diode (not shown) can be used to replace the sensor 106. The photo-diode is attached to the housing and is used to detect position of the body 13 by looking through a plurality of spaced-apart holes that are optionally provided in the body 13. The spaced apart holes are located where each of the permanent magnets 104 is disposed.

It is also possible to dispose a plurality of the floating armature electric motors 10 in a side-by-side orientation and connect at least one of the shafts 25 to each of the plurality. This is useful to increase torque output, as desired.

The instant invention can be used for all manner of purposes, in all sizes, horsepower and torque ratings. It can be used for commercial, home, industrial, military, aerospace, and other applications. It can even be used with toys.

An exceptional benefit provided by the instant device is that the rotor body 13 except for the iron segments 12 (i.e., the ferric elements) and most of the stator (i.e., virtually all of the housing except the coils) of the floating armature electric motor 10 can be built of light inexpensive materials such as plastics, an unusually light-weight device can be made.

Because a great deal of torque (and power) is generated by a simple, reliable, and light motor, a variety of novel applications are also possible. For example, it is possible to include the drive shaft mentioned hereinbefore and to extract power for any purpose. One such purpose could be to dispose a propeller in the hollow center. By well known principles of varying gear ratios (or by a belt drive and variable pulley sizes) it is possible to rotate the propeller at a considerably higher speed (rpm) than that of the rotor body 13. By disposing a plastic shroud over the top of the motor 10, thus modified, it is possible to drive a high volume of air at high speed through the center of the floating armature electric motor 10 and to possibly also create a venture-type of air flow there-through.

Accordingly, sufficient thrust to elevate the housing above a ground surface is developed by the floating armature electric motor 10. The economical production of a simple, reliable, light weight flying toy is therefore possible and it could be powered by its own on-board lightweight battery (not shown) or it could be connected by a lightweight flexible pair of electrical wires to a ground-based electrical power source (not shown).

The floating armature electric motor 10 can be constructed to provide any preferred degree of durability and power output desired. Accordingly, it can be used for any preferred application, including civilian and military applications.

It may even be possible to make a type of flying military aircraft that is powered by the floating armature electric motor 10. The floating armature electric motor 10 is also expected to be used as a motive source for electric powered vehicles and also for hybrid types of gasoline (or other fuel source) and combination electric vehicles.

It is also possible to control torque by controlling the current through any of the electromagnetic coils 14, 20. More current will, of course, increase the strength of the magnetic field that is produced which will, in turn, increase the torque of the motor 10. This is useful in startup of certain applications where greater torque may temporarily be required.

After the rotor body 13 has reached its preferred or ideal speed, the current that is applied to the coils 14 is reduced to create equilibrium of force and therefore to maintain a preferred speed, for example. The speed of the motor is determined by monitoring the sensor 106 output over a period of time (for example, as determined by a microprocessor controller that is attached to the housing). Accordingly, a variable torque motor is provided.

Similarly, when periods of increased work (output) are required by the motor, the current through the coils 14 is increased to maintain speed of the rotor 13 and accomplish the work. Accordingly, a variable horse-power (output) motor is provided.

Similarly, the speed of the motor 10 can be regulated, speeding the motor 10 for certain applications and then slowing it for other applications, as may be desired.

This variability in torque and horsepower and motor 10 speed is achieved in unison with the other benefits that this design provides, for example, a motor 10 that is light weight, thin in size, includes a simplicity of design, ease of assembly, ease of repair, high reliability, and which also provides high efficiency of operation.

An additional benefit is also provided and that is to provide an electric braking capability by the floating armature electric motor 10. If preferred, the coils 14 can be energized for any desired duration of time. Whenever a coil 14 (or plurality thereof) is energized for an extended period of time, the magnetic field produced by it will create a force that attracts a proximate iron segment 12 (i.e., ferric element) toward the coil 14.

Because of inertia the iron segment 12 may overshoot the coil 14 but eventually the rotor-body 13 will slow down and stop. When it stops the magnetic field produced by each coil 14 will create a force that is attempting to center a corresponding one of the iron segments 12 in a center of the magnetic field.

A force is thereby produced that is attempting to retain each of the iron segments 12 in the center of the magnetic field (and presumably in the geometric center of the coils 14) and is maintained for as long as the coil 14 is energized by the flow of electrical current therethrough.

Accordingly, an electric braking capability is provided by the floating armature electric motor that helps prevent rotation of the rotor body 13 with respect to the housing. Accordingly, any load that is mechanically connected to the rotor body 13 will experience a force that tends to retain it in position, as well.

If a plurality of the coils 14 include a plurality of the iron segments 12 disposed in such a manner that they are all centered in each coil, a variable degree of braking is provided by energizing a variable number of the coils 14 up to a maximum of fully energizing (i.e., with a maximum current flowing through each coil 14) all of the coils 14 simultaneously.

Accordingly, two ways of varying the braking force are provided, the first being by varying the number of coils 14 that are simultaneously energized and the second being to vary the strength of the magnetic field produced any or all of the coils 14 by varying a magnitude of the current that is passing through any of the coils 14.

Accordingly, a variable strength braking system is provided that is especially useful to rapidly remove inertia caused by the rotor body 13 and by a heavy load that is connected thereto by maximally energizing all of the coils 14 simultaneously. A capability of efficiently maintaining the rotor body 13 and the heavy load at a standstill is provided by energizing some or all of the coils 14 to a minimum degree necessary. The sensor 106 output can be used to detect rotation of the rotor body 13 and additional coils 14 can be energized to any preferred degree to stop rotation of the body 13 (and load) from occurring.

This provides a fully variable electrical braking capability while also using a minimum amount of electrical energy to do so.

Additionally, other modifications are possible. For example, with certain applications it is preferable to replace the gear-tooth outer perimeter 22 with a chain (not shown) similar to a bicycle drive chain. The chain could be in an outer perimeter circumferential recess that was molded, out of plastic for example, to match the inner shape of the chain, thereby securing the chain in position around the body 13, and transferring power from the rotor body 13 to the chain. The gears 24 would then be replaced with sprockets (not shown) to extract power from the chain.

An advantage of the use of a chain for certain applications is that the chain and sprocket can run without lubrication for longer periods of time. Also, the cost of manufacture is decreased by not having to include the gear-tooth outer perimeter 22 in the body 13. Instead the body 13 is molded, as described above simply and inexpensively, and the chain is added to the body 13 prior to final assembly after the coils 14, 20 have been disposed around the assembled rotor body 13.

Another advantage to this design is that the chain can be replaced easily and economically when it wears, as opposed to having to replace the entire rotor body 13 when the gear-tooth outer perimeter 22 wears. Also, the chain and sprocket are light in weight.

Of course, other drive means are possible including a belt drive, wherein a belt is disposed around a modified type of the outer perimeter circumferential recess and used to drive a pulley that supplies power to a load.

Idler wheels (not shown) could then be used in place of the gears 24 to engage with the belt and or the outer perimeter circumferential recess and to maintain the floating appearance of the rotor body 13 of the floating armature electric motor 10. The rotor body 13 is suspended and secured by the gears 24 (or by the idler wheels) as opposed to being directly attached to the housing. This gives the appearance that the rotor (i.e., the body 13) is floating inside the housing.

Figure 4:
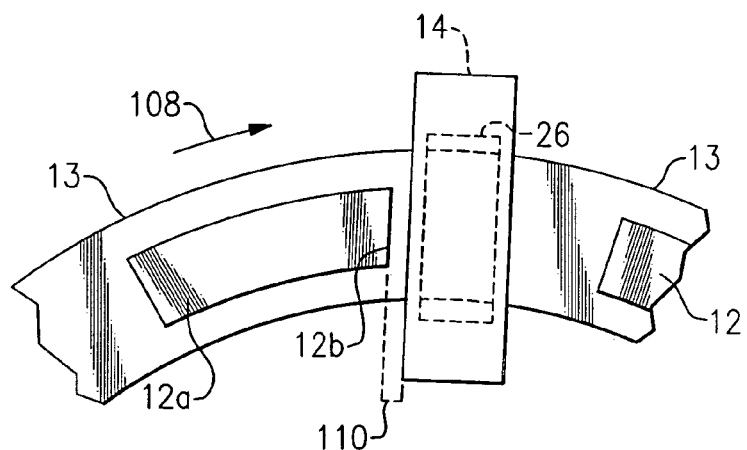
FIG. 4 is a top view of the rotor of the floating armature electric motor of FIG. 1 showing a nearly ideal position of a portion of a rotor relative to a position of an electro-magnetic coil to initiate energizing of the coil.

Referring now to FIG. 4 is shown a nearly ideal position of a first iron segment 12a just prior to energizing of the coil 14. The first iron segment 12a is typical of the remainder of the iron segments 12. It is contained in the rotor body 13 and is approaching the coil 14. A direction arrow 108 shows the direction of rotation of the rotor body 13. A portion of the rotor body 13 is passing through the hollow center 26 (shown by dashed lines) of the coil 14.

A leading edge 12b of the first iron segment 12a is just about to enter into a magnetic field that is produced by the electromagnetic coil 14. A gap 110 shown by a bracket shows the leading edge 12b of the first iron segment 12a to be disposed slightly ahead of the coil 14.

While this distance can vary any amount desired depending on the purpose of the floating armature electric motor 10 and therefore on its design attributes, it is expected that an ideal gap 110 will often be from about one-eight of an inch to about one-half of an inch with about one-quarter of an inch being a common gap 110 width for certain designs.

Of course, with larger versions of the floating armature electric motor 10 the gap 110 can be considerably larger, perhaps up to a few feet in size if the rotor body 13 is many feet in diameter and in smaller versions the gap 110 can be reduced or eliminated, as desired.

An important purpose of the instant invention is to conserve electrical energy by optimizing efficiency of the floating armature electric motor 10. To optimize efficiency of any version of the motor 10, it is important to energize the coils 14 only when the resultant magnetic field will apply a substantial-enough force to at least one of the iron segments 12 to urge it or them in the direction of rotation (108).

Electrical energy is only consumed by the floating armature electric motor 10 when the coils 14 are energized. Therefore it is desirable to limit the time of energizing for each coil 14 to when the force that is applied to the iron segments 12 is substantial enough to do useful work. That is why, depending of course on the size of the motor 10 and the magnetic field, it makes little sense to energize the coil 14 when the iron segments 12, 12a are disposed too far away from the coil 14 to experience a significant magnetic attraction force.

When the leading edge 12b is disposed, as shown, as far from the coil 14 as the desired gap 110, the coil 14 is then energized to create the magnetic field which acts on the first segment 12a and applies a force thereto that urges it in the direction of the direction arrow 108. Because the first segment 12a is attached to the rotor body 13, a force is applied to the body 13 by the pull that is experienced by the first segment 12a which also urges the body 13 to move (i.e., to rotate) in the direction as shown by the direction arrow 108.

The size of the gap 110 can be fixed or, as described hereinafter, it can be a variable. For example, a control circuit (as described in greater detail hereinafter) can include means for sensing of the speed of the rotor body 13 (rpm) and the control circuit can alter the gap 110 (i.e., the distance the first segment 12a is disposed away from the coil 14 when the coil 14 is energized) in relation to any desired parameter, for example, in relation to rotor (13) speed.

Depending on the design of the motor 10, it may be preferable to increase the gap 110 in proportion to increasing rotor 13 speeds. It may instead (or also) be preferable to increase the gap 110 when an increased torque demand is present, even if this temporarily results in lowered engine efficiency, because the overall torque capability of the motor 10 can in this manner be increased or decreased, accordingly.

Similarly, it may be preferable to reduce the gap 110 under certain conditions, for example, to maximize efficiency when the motor 10 is at full speed and torque demands are low. This reduces the overall amount of time that the coils 14 are energized (on) compared to the time that they are not. This results in a lower duty cycle of coil 14 energizing, which results in the consumption of less electricity, which increases motor 10 efficiency.

Figure 5:
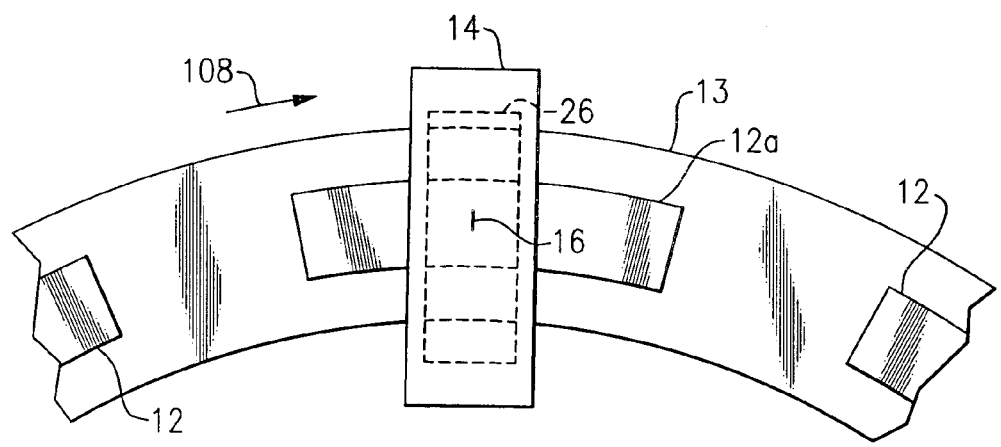
FIG. 5 is a top view of the rotor of the floating armature electric motor of FIG. 1 showing a nearly ideal position of a portion of a rotor relative to a position of an electro-magnetic coil to de-energize the coil.

Referring now to FIG. 5 is shown a nearly ideal position of a first iron segment 12a just prior to a de-energizing of the coil 14.

The geometric center mark 16 of the first iron segment 12a is disposed in the center of the coil 14 and in the center of the magnetic field. This is the "at rest" position that the first iron segment 12a would seek to obtain if the coil 14 were constantly energized. If the rotor body 13 were not rotating, it is in this position that the first iron segment 12a would seek to be disposed, in the center of the magnetic field, and therefore in a state of equilibrium of forces.

When the motor 10 is used for braking (as was described hereinabove), any attempt by a load to displace the first iron segment 12a away from this position will result in a loss of equilibrium with a resultant magnetic force being applied to the first iron segment 12a attempting to urge it back in the position, as shown. It matters not if the load attempts to displace the first iron segment 12a in the direction of arrow 108 or in an opposite direction; a force will be applied to the iron segment 12a that attempts to center it in the magnetic field.

This, while especially useful for braking purposes, has a negative consequence when the motor 10 is running. If the body 13 of the motor 10 is rotating in the direction of arrow 108, assuming the coil 14 remains energized, the moment the center geometric mark 16 passes beyond the center of the magnetic field, a force is applied to the first iron segment 12a attempting to pull it back toward the center of the coil 14 and in a direction opposite that as shown by arrow 108.

The motor 10 would then effectively be working against its own power output, if this condition were allowed to occur. Efficiency would drop significantly and in proportion to the length of time the coil 14 remained energized after the first iron segment 12a had passed the magnetic field's midpoint.

It is therefore important to de-energize the coil 14 as close to the moment that the center of the first iron segment 12a moves beyond the center of the coil 14, or more precisely, the moment the center of the first iron segment 12a rotates beyond the center of the magnetic field that is generated by the coil 14.

Because of electrical induction by the coil 14 and other factors, the magnetic field may persist for a period of time after the coil 14 has been de-energized. Therefore, in order to ensure that the magnetic field is not operating on the first iron segment 12a after it has moved past the position shown in FIG. 5, it is desirable to de-energize the coil slightly before the geometric center mark 16 aligns with the center of the magnetic field of the coil 14.

For the example shown, it is presumed that the center of the magnetic field and the center of the coil 14 are in alignment. Of course, while ideal operation is shown in relation to the one iron segment (12a) to the one coil 14, the same preferred relationship is occurring simultaneously in relation to the position of each of segments 12 and each of the coils 14.

A well designed offset in the positioning of the coils 14 and/or the iron segments 12 in the rotor body 13 can be used for a variety of beneficial purposes, for example, to increase motor 10 efficiency, smoothness (decrease vibration), and to provide a more uniform torque output by the motor 10. The ideal offset from coil 14 to coil 14 or from segment 12 to segment 12, if any, is influenced substantially by the application for which the motor 10 is designed to be used.

Referring momentarily back to FIG. 4, because of the electrical induction of the coil 14, it is similarly desirable to energize the coil before optimum strength of the magnetic field is desired. The timing as to how soon to energize the coil 14 is a function of the speed of the rotor body 13, the load on the motor 10, and the efficiency curve that is desired for the motor 10. It is important to understand that precise control as to the timing for both the energizing and the de-energizing of each of the coils 14 is paramount to and optimizing of the performance of the floating armature electric motor 10.

Figure 6:
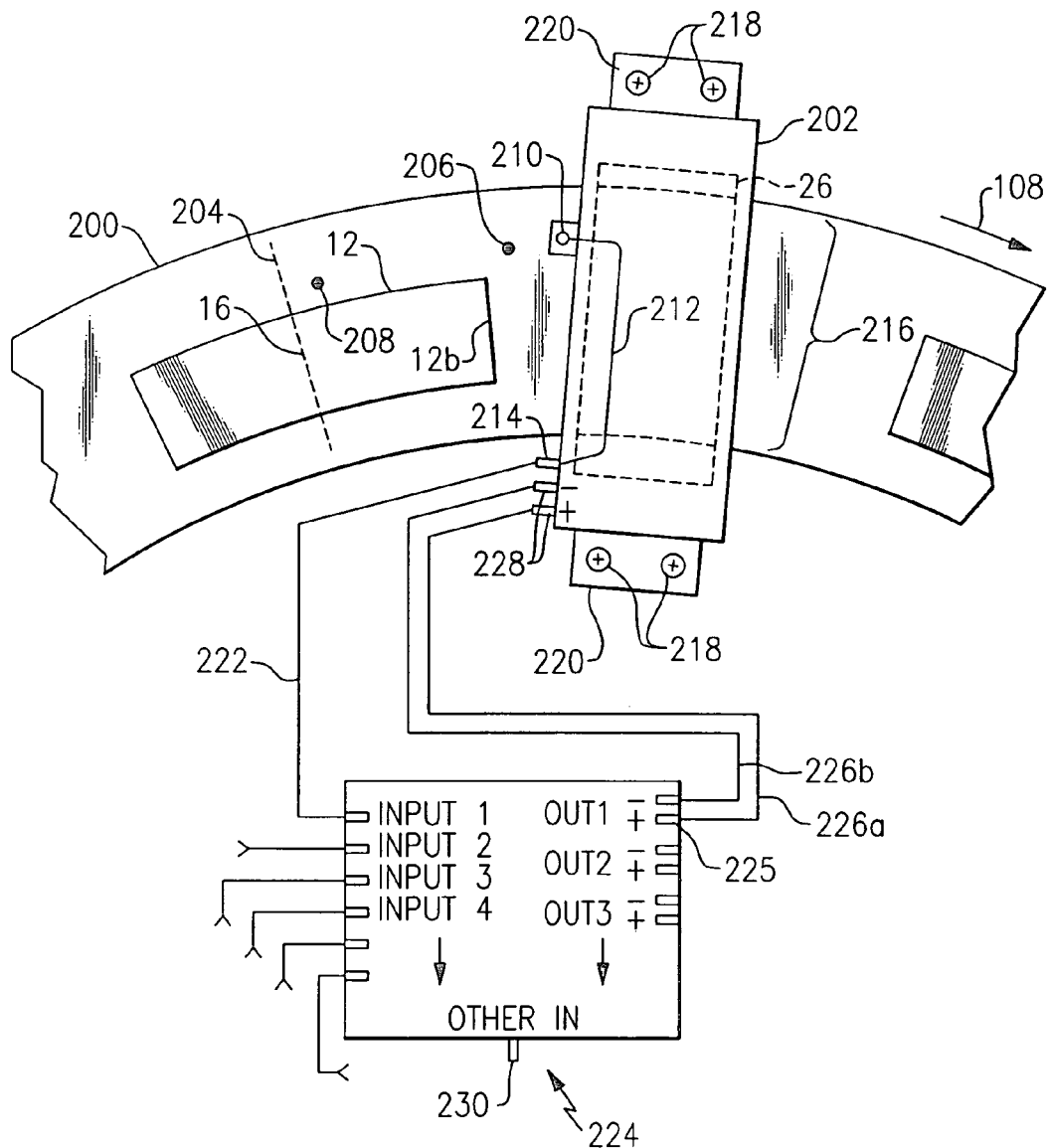
FIG. 6 is a top view of the floating armature electric motor of FIG. 1 and including means for sensing a position of a rotor relative to a position of an electro-magnetic coil.

Referring now to FIG. 6 a method for sensing a position of a modified rotor 200 relative to a position of a modified type of an electro-magnetic coil 202 is shown.

The geometric center mark 16 is shown in the longitudinal center of one of the iron segments 12. A center line 204 extends through the segment 12 to show the midpoint of the segment 12 along a portion of the body of the modified rotor 200.

A first magnet 206 is disposed in the modified rotor 200 a predetermined distance before the leading edge 12b of the segment 12. A second magnet 208 is disposed in the modified rotor 200 a predetermined distance before the geometric center mark 16 of the segment 12. (The first magnet 206 and the second magnet 208 are used instead of the permanent magnets 104 as shown in FIG. 1.) The distance the first magnet 206 precedes the leading edge 12b and the distance the second magnet 208 precedes the center line 204 (i.e., the geometric center mark 16) are design variables and can vary as desired.

If preferred for special applications of the floating armature electric motor 10, the first magnet 206 can be set to align with the leading edge 12b or the second magnet 208 can be set to align with the geometric center mark 16.

Attached to the modified coil 202 is a coil-mounted sensor 210, similar to the sensor 106 that was attached to the housing (stator). The coil-mounted sensor 210 is attached to the modified coil 202 so that it will be able to detect passage of the first magnet 206 and the second magnet 208 when they pass underneath the coil-mounted sensor 210. The coil-mounted sensor 210 includes a sensor output 212 that is electrically connected to a sensor output contact 214 of the modified coil 202.

It is important to note that an unexpected benefit of this configuration is that the need to determine position of the modified rotor 200 with respect to the housing is eliminated. Instead, position of the modified rotor 200 relative to the modified coil 202 is determined by the present configuration. This makes for assembly of the motor 10 even easier in that it is no longer necessary to precisely orient the modified rotor 200 with respect to the housing.

A second unexpected benefit is also provided that speeds assembly and decreases manufacturing cost. The position of the modified coil 202 with respect to the housing is no longer critical. Rather, after the two halves of the modified rotor 200 have been assembled, the modified coils can be dispersed in a non-critical manner around the circumference of the modified rotor 200 and then fastened to the housing.

The precise positioning or the spacing between each of the modified coils 202 is no longer of critical concern. Other than ensuring that the hollow center 26 is roughly centered over a height of the modified rotor, as shown by bracket 216, the modified coils 202 can be placed anywhere along the circumferential length of the modified rotor 200. The modified coils 202 are then secured to the housing by self-tapping screws 218 that pass through holes provided in a modified bracket 220.

Of course, tapped holes can be provided in the housing and the modified coils 202 can be located in a preferred spaced-apart orientation for certain applications that can benefit from other advantages afforded by the instant configuration, as described in greater detail hereinafter.

After all of the modified coils 202 have been attached to the housing, an input wire 222 is attached to a first input of a control circuit, identified in general by the reference numeral 224. A corresponding first output 225 of the control circuit 224 includes a pair of wires 226a, 226b that supply electrical current to a pair of power input contacts 228 of the modified coil 202.

For the purpose of the illustration, it is assumed that the first output 225 is direct current (DC) but if preferred for certain applications alternating current (AC) can be used to energize the modified coils 202 (or the coils 14), as desired.

The control circuit 224 can include analog electrical components, a microprocessor, or any other preferred type of control means. Of course, the first and second magnets 206, 208 can be eliminated and other sensing means employed.

For example, if preferred, the modified rotor 200 could be opaque to a particular wavelength of light and each of the eliminated first and second magnets 206, 208 could instead include a first hole and a second hole, respectively in its place that is provided through the modified rotor 200.

A source of illumination at that particular wavelength could be disposed under the modified rotor and could pass through the first and second holes. The coil-mounted sensor 210 could be replaced by a light sensing component (i.e., a photo-diode, for example) to detect when the first hole is disposed and aligned thereunder and when the second hole is disposed and aligned thereunder. Other ways of sensing position of the modified rotor 200 with respect to the modified coil 202 are, of course, possible.

As many other inputs and outputs for the control circuit 224 are provided as modified coils 202 are used. This allows for random positioning of the modified coils 202 around the modified rotor 200.

If an excess of inputs and outputs are provided (for example for higher horsepower versions of the motor 10) and are not used because there are an insufficient number of the modified coils 202, which is fine. Since no input for these unused inputs is ever sensed by the control circuit, the corresponding outputs are never activated. This allows the use of the same control circuit 224 with a variety of designs and modifications of the motor 10 and decreases cost of manufacture of the control circuit 224, thereby providing another benefit to this design.

If, however, the position of any of the modified coils 202 is predetermined (for example, if the tapped holes are included) and if the predetermined position of any two or more of the modified coils 202 as compared to the position of any two or more of the segments 12 will be the same, then only one input and one output of the control circuit 224 are required for all of the similarly disposed modified coils 202.

To begin a description of motor 10 operation with the modified rotor 200 and the modified coil 202 (a plurality thereof are expected to be used), assume that the modified coil 202 is de-energized and that the position of the most proximate iron segment 12 that is approaching the modified coil 202 in the direction of arrow 108 is as shown in FIG. 6.

As rotation of the modified rotor 200 continues, eventually the first magnet 206 (or hole) will align with the coil-mounted sensor 210 and produce the sensor output 212 by way of a "pulse output". The control circuit 224 detects this and activates the first output 225, thereby energizing the modified coil 202 and creating a magnetic attraction force that is experienced by the segment 12 urging it in the direction of arrow 108. The energizing can occur immediately or the control circuit 224 can introduce a first delay to optimize performance, as described below.

This creates torque and in combination with inertia urges the modified rotor 200 until the second magnet 208 (or hole) aligns under the coil-mounted sensor 210. Another pulse output is generated and sensed by the control circuit 224 which now deactivates or de-energizes the first output 225. The magnetic field dissipates by the time the geometric center mark 16 aligns with the center of the modified coil 202.

Accordingly, optimum efficiency of operation is attained. The de-energizing can occur immediately or the control circuit 224 can introduce a second delay to optimize performance, as is also described below.

To further optimize motor design, it is desirable to sense the speed (rpm) of the modified rotor 200 and the load that is experienced by the motor 10. These two input parameters, taken together or separately, along with an assessment as to whether the modified rotor 202 is accelerating or decelerating are preferably used to further optimize performance of the motor 10. Performance can include providing maximum torque, maximum horsepower, or optimizing efficiency.

The speed of the modified rotor 200 is determined by the control means measuring the amount of time between detection of the first pulse when the first magnet 206 aligns with the coil-mounted sensor 210 until the second magnet 208 aligns with the coil-mounted sensor 210. A shortening of this time interval indicates acceleration by the modified rotor 200. A lengthening of this time interval indicates deceleration by the modified rotor 200. A monitoring of the average power output (i.e., the current through the all of the outputs 225) provides an indication of the torque and whether the load that the motor is increasing or decreasing.

If increased horsepower or torque is required, there are two basic ways to attain this. First, the timing as to when the modified coil(s) 202 is energized and de-energized can be varied. After detection of the first magnet 206 any delay in energizing the modified coil 202 is reduced or eliminated to increase the "on time" or duty cycle of the modified coil 202 and to produce maximum torque.

Second, the current or voltage (or both) of the first output 225 (and each of the remaining active outputs) is increased up to the maximum to increase current through the modified coil 202. This, in turn will increase the strength of the magnetic field and therefore increase the magnitude of the attraction force that is experienced by the segment(s) 12. Accordingly, more torque is produced and over time, more horsepower.

Accordingly, the floating armature electric motor 10 can provide variable performance characteristics, such as variable horsepower, torque, and efficiency without any physical change in the construction of the motor 10. Furthermore, these changes can occur in real time to accommodate changes in load.

If desired, any other parameter can also be monitored by the control circuit 224 and used to alter performance of the motor 10. For example, an additional other input 230 can be included to monitor temperature of the motor 10 and, if an excessive rise in temperature were to occur, to limit the amount of electrical power that is being provided through the first output 225 and through the remaining outputs to prevent overheating and extend the life of the motor 10.

The invention has been shown, described, and illustrated in substantial detail with reference to the presently preferred embodiment. It will be understood by those skilled in this art that other and further changes and modifications may be made without departing from the spirit and scope of the invention which is defined by the claims appended hereto.

What is claimed is:

1. A floating armature electric motor, comprising:
   (a) a rotor, said rotor including a body having a generally toroid shape thereto, and including a plurality of iron segments disposed in a spaced-apart orientation in said body, and wherein said rotor includes a first half and a second half, and wherein a portion of overlap is provided with respect to said first half and said second half when said first half and said second half are fastened together to form said rotor;
   (b) a stator, said stator including a plurality of coils, each of said coils including an open center and disposed in a spaced apart orientation with a portion of said body of said rotor passing through each of said open centers; and
   (c) means for supplying electrical energy to said coils.

2. The floating armature electric motor of claim 1 wherein said body is formed substantially of a non-magnetic material.

3. The floating armature electric motor of claim 1 wherein said overlap includes means for fastening said first half to said second half.

4. The floating armature electric motor of claim 1 wherein said plurality of coils includes a first group of coils and a second group of coils.

5. The floating armature electric motor of claim 4 wherein when said first group is energized, said second group is not energized and wherein when said second group is energized, said first group is not energized.

6. The floating armature electric motor of claim 1 wherein said means for supplying electrical energy to said coils includes means for periodically energizing at least some of said coils.

7. The floating armature electric motor of claim 6 wherein said means for periodically energizing at least some of said coils includes means for periodically energizing a first group of said plurality of coils and de-energizing a remainder of said plurality of coils.

8. The floating armature electric motor of claim 1 wherein said means for supplying electrical energy to said coils includes means for periodically energizing at least some of said coils for a first period of time and de-energizing said at least some of said coils for a second period of time.

9. The floating armature electric motor of claim 8 wherein said means for periodically energizing at least some of said coils for a first period of time and de-energizing said at least some of said coils for a second period of time includes means for repeating said pattern whenever said floating armature electric motor is in operation.

10. A floating armature type of an electric motor, according to claim 1 comprising:

means for sensing the position of at least one ferric element of the rotor of said motor, said means for sensing including an output that is indicative of the position of said at least one ferric element with respect to at least one coil, said at least one coil used to generate a magnetic field that surrounds a portion of said rotor when an electrical current is flowing through said at least one coil; and means for controlling when said electrical current is flowing through said at least one coil, said output supplying a signal to said means for controlling, said means for controlling adapted to energize said at least one coil when said at least one ferric element is disposed in a first position and to de-energize said at least one coil when said ferric element is disposed in a second position.

11. The improvement of claim 10 wherein said improvement further comprises:

said means for controlling including means for sensing an input parameter, said parameter including either a speed of rotation of said rotor or a magnitude of a load that is experienced by said motor, or both, and wherein in response to a detection of a change in said parameter, said means for controlling is adapted to energize said at least one coil when said at least one ferric element is disposed in a third position that is different than said first position.

12. The improvement of claim 10 wherein said improvement further comprises:

said means for controlling including means for sensing an input parameter, said parameter including either a speed of rotation of said rotor or a magnitude of a load that is experienced by said motor, or both, and wherein in response to a detection of a change in said parameter, said means for controlling is adapted to de-energize said at least one coil when said ferric element is disposed in a fourth position that is different than said second position.

13. An improvement to a floating armature type of an electric motor, wherein the improvement comprises:

a rotor, said rotor including a body having a generally donut-shape thereto, and including a plurality of iron segments disposed in a spaced-apart orientation in said body, and wherein said rotor includes a first half of a first sensor and a stator, and wherein said stator includes at least one coil attached thereto, said coil for producing a magnetic field when a current passes through said coil, and wherein said coil includes a second half of a second sensor, and wherein said first half of sensor and second sensor provide an output as to a position of said rotor with respect to said stator.

14. The improvement of claim 13 wherein said floating armature type of an electric motor includes a plurality of said coils and a plurality of said iron segments and wherein when any of said coils are energized said magnetic field produces a force, and wherein said force urges a proximate one of said plurality of said iron segments toward said coil.

15. The improvement of claim 14 wherein said force, when applied for a sufficiently long period of time, urges said proximate one of said plurality of said iron segments into said coil wherein a center of said proximate iron segment aligns with a center of said magnetic field.

* * * * *